(12) United States Patent
Wang et al.

(10) Patent No.: US 12,378,135 B2
(45) Date of Patent: Aug. 5, 2025

(54) DOUBLE-WATER-OUTPUT CYLINDRICAL INTEGRATED WATER PURIFIER

(71) Applicant: SHANGHAI CONJOIN WATER PURIFICATION TECHNOLOGY CO., LTD., Shanghai (CN)

(72) Inventors: Jinghui Wang, Shanghai (CN); Haitao Liu, Shanghai (CN)

(73) Assignee: SHANGHAI CONJOIN WATER PURIFICATION TECHNOLOGY CO., LTD., Shanghai (CN)

(*) Notice: Subject to any disclaimer, the term of this patent is extended or adjusted under 35 U.S.C. 154(b) by 751 days.

(21) Appl. No.: 17/439,474

(22) PCT Filed: May 23, 2019

(86) PCT No.: PCT/CN2019/088094
§ 371 (c)(1),
(2) Date: Sep. 15, 2021

(87) PCT Pub. No.: WO2020/206818
PCT Pub. Date: Oct. 15, 2020

(65) Prior Publication Data
US 2022/0153608 A1 May 19, 2022

(30) Foreign Application Priority Data
Apr. 9, 2019 (CN) .......................... 201910278968.3

(51) Int. Cl.
*C02F 1/00* (2023.01)
*B01D 29/11* (2006.01)
(Continued)

(52) U.S. Cl.
CPC ............ *C02F 1/003* (2013.01); *B01D 29/114* (2013.01); *B01D 29/58* (2013.01); *B01D 29/606* (2013.01);
(Continued)

(58) Field of Classification Search
None
See application file for complete search history.

(56) References Cited

U.S. PATENT DOCUMENTS
2017/0291127 A1  10/2017  Rajagopal et al.

FOREIGN PATENT DOCUMENTS
CN  202549188 U  * 11/2012  .......... G09F 9/3026
CN  105036249 A  * 11/2015
(Continued)

OTHER PUBLICATIONS
International Search Report of PCT/CN2019/088094.
Written Opinion of PCT/CN2019/088094.

*Primary Examiner* — Magali P Slawski
*Assistant Examiner* — Eric J McCullough
(74) *Attorney, Agent, or Firm* — Troutman Pepper Locke LLP; Tim Tingkang Xia, Esq.

(57) ABSTRACT

Disclosed is a double-water-output cylindrical integrated water purifier. A clean water flow channel, a pure water branch flow channel and a waste water bypass flow channel are further provided in the base, and a clean water outlet in communication with the clean water flow channel is provided at a side of the base; the pure water flow channel is communicated with the clean water flow channel via the pure water branch flow channel, and a second check valve for controlling water to flow into the clean water flow channel unidirectionally is disposed in the pure water branch flow channel; the waste water outlet end face is further communicated with the clean water flow channel via the waste water bypass flow channel, and a third check valve for controlling water to flow into the clean water flow channel unidirectionally is disposed in the waste water bypass flow channel.

9 Claims, 13 Drawing Sheets

Figure 1:
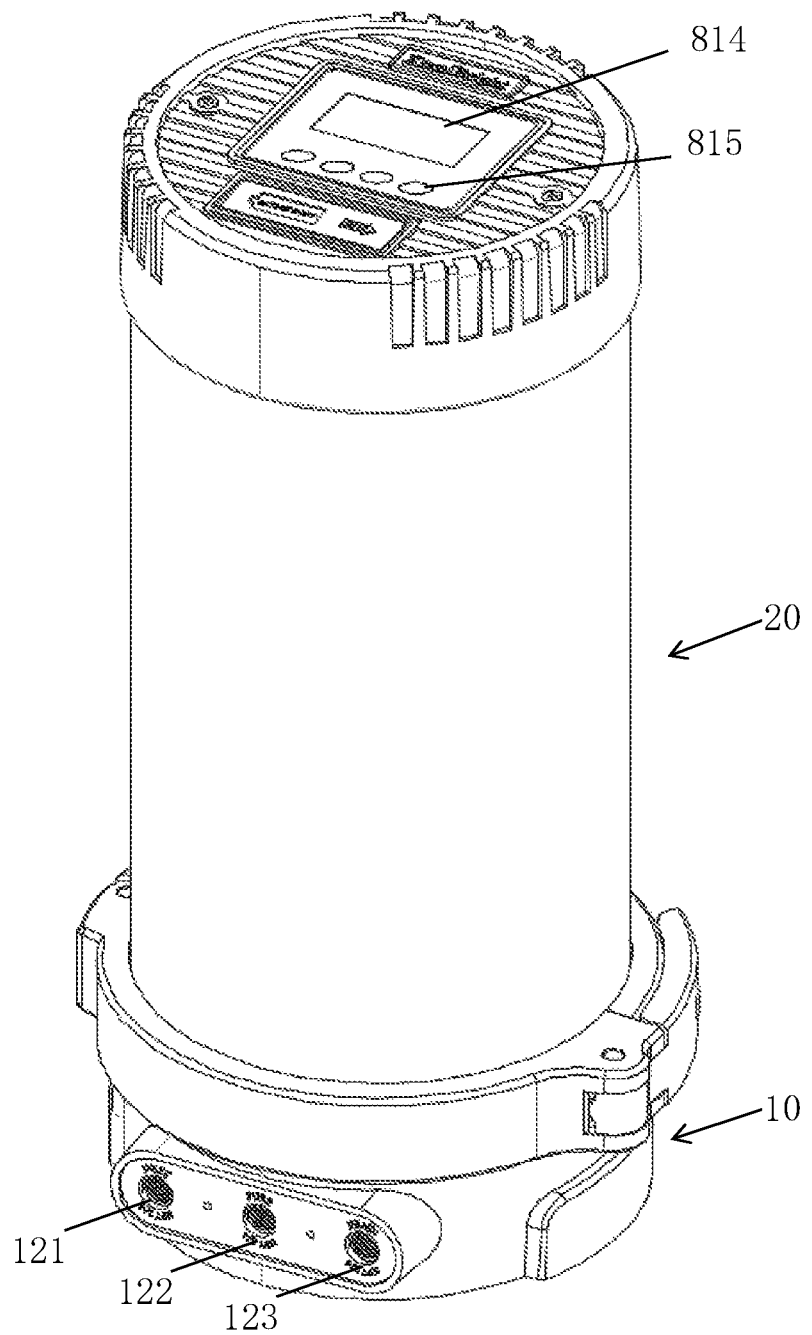

(51) Int. Cl.
    *B01D 29/58*     (2006.01)
    *B01D 29/60*     (2006.01)
    *B01D 35/157*     (2006.01)
    *B01D 35/30*     (2006.01)
    *C02F 1/44*     (2023.01)

(52) U.S. Cl.
    CPC ......... *B01D 35/1573* (2013.01); *B01D 35/30* (2013.01); *C02F 1/441* (2013.01); *B01D 2201/16* (2013.01); *B01D 2201/305* (2013.01); *C02F 2201/004* (2013.01); *C02F 2201/005* (2013.01); *C02F 2209/03* (2013.01); *C02F 2307/06* (2013.01)

(56) References Cited

FOREIGN PATENT DOCUMENTS

| | | | |
|---|---|---|---|
| CN | 205367941 U | * | 7/2016 |
| CN | 106219793 A | | 12/2016 |
| CN | 205760097 U | | 12/2016 |
| CN | 205773441 U | * | 12/2016 |
| CN | 106512529 A | | 3/2017 |
| CN | 107261613 A | | 10/2017 |
| KR | 20170083315 A | | 7/2017 |

* cited by examiner

DOUBLE-WATER-OUTPUT CYLINDRICAL INTEGRATED WATER PURIFIER

CROSS-REFERENCE TO RELATED APPLICATIONS

This Application is a national stage application of PCT/CN2019/088094. This application claims priorities from PCT Application No. PCT/CN2019/088094, filed May 23, 2019, and from the Chinese patent application 201910278968.3 filed Apr. 9, 2019, the content of which are incorporated herein in the entirety by reference.

TECHNICAL FIELD

The present invention belongs to the field of household water purifier technologies, and in particular to a cylindrical integrated water purifier.

BACKGROUND

Water is a source of life, and the quality of domestic drinking water is closely related to the physical health of people. Investigations of the World Health Organization (WHO) show that 80% of diseases and 50% of children deaths all over the world are related to poor quality drinking water. A quarter of the Chinese population are drinking water noncompliant with the sanitary standard, and therefore "water pollution" has already become a major water environment problem in China.

After many years of propaganda and popularization of drinking water knowledge and health knowledge, people have come to understand the impact of the quality of drinking water on human health and focus more attention on the safety of drinking water, which provides a broad market prospect for use of water purifier products. Currently, 95% of families in developed European and American countries are using household water purifiers, whereas less than 5% of families in China are using them. Therefore, there is a large development potential for water purifiers in China.

At present, the major water purifiers on market are split type, in which different filters are connected in series by pipelines. Such water purifiers have complex structures and large volumes, and their filter elements are also inconvenient to service or replace. Later, there emerges an integrated water purifier with filter elements integrated in a filter cylinder. The integrated water purifier has a compact structure, occupies a small space, and its filter element is very convenient to service or replace, thereby gaining increased popularity among consumers. However, conventional integrated water purifiers will not automatically stop water purification when full, but continue purifying water. In this case, a large amount of water will be discharged as waste water, leading to waste of water resources.

Therefore, a cylindrical integrated water purifier with a flow control base to realize communication with a water passage is disclosed, thereby avoiding cumbersome and entangled pipelines and gaining high popularity among users. Due to structural limitations, existing cylindrical integrated water purifiers can only make a single type of water, i.e. pure water or clean water (i.e., after primary filtration, harmful substances are removed, but a trace amount of impurities still exist). However, in addition to drinking requirements, users also have non-drinking requirements for water, for example, requirements for washing fruits and vegetables. For such requirements, there is no need to use pure water (because an amount of waste water equivalent to several multiples of pure water can be generated during use of pure water, leading to increased water consumption). Furthermore, the output of pure water is limited, resulting in low cleaning efficiency and inconvenience.

Therefore, it is necessary to improve the existing cylindrical integrated water purifiers to develop a cylindrical integrated water purifier with a double-water-output function which can produce both pure water and clean water to satisfy the drinking and non-drinking requirements of the users.

SUMMARY

In response to the aforementioned technical problems, the present invention provides a double-water-output cylindrical integrated water purifier which can provide both pure water and clean water to overcome the shortcomings of the prior art.

To solve the aforementioned technical problems, the present invention adopts the following technical solution.

A double-water-output cylindrical integrated water purifier includes a base, a filter cylinder mounted on the base, and a filter element assembly located in the filter cylinder; a raw water flow channel, a pure water flow channel and a waste water flow channel are disposed in the base, and a raw water inlet in communication with the raw water flow channel, a pure water outlet in communication with the pure water flow channel, and a waste water outlet in communication with the waste water flow channel are disposed at a side of the base respectively; a pure water production pipe of the filter element assembly is in communication with the pure water flow channel, and a first check valve for controlling water to flow into the pure water flow channel unidirectionally is disposed therebetween; a waste water outlet end face of the filter element assembly is in communication with the waste water flow channel; a control valve for controlling the raw water flow channel to be turned on and off based on a water pressure of the pure water flow channel is disposed in the base, a clean water flow channel, a pure water branch flow channel and a waste water bypass flow channel are also disposed in the base, and a clean water outlet in communication with the clean water flow channel is disposed at a side of the base; the pure water flow channel communicates with the clean water flow channel via the pure water branch flow channel, and a second check valve for controlling water to flow into the clean water flow channel unidirectionally is disposed in the pure water branch flow channel; the waste water outlet end face also communicates with the clean water flow channel via the waste water bypass flow channel, and a third check valve for controlling water to flow into the clean water flow channel unidirectionally is disposed in the waste water bypass flow channel.

In the above technical solution, the clean water flow channel is added in the base, the pure water flow channel is communicated with the clean water flow channel via the pure water branch flow channel, the clean water flow channel is communicated with the waste water outlet end face of the filter element assembly via the waste water bypass flow channel, the clean water outlet is connected to a clean water pipe of a double-water-output faucet, and the pure water outlet is connected to a pure water pipe of the double-water-output faucet. In this way, double water outputs are realized to provide pure water and large-flow clean water, thereby satisfying various water use requirements of users and reducing waste water discharge.

BRIEF DESCRIPTIONS OF THE DRAWINGS

The present invention will be described in detail below in combination with the following accompanying drawings.

Figure 2:
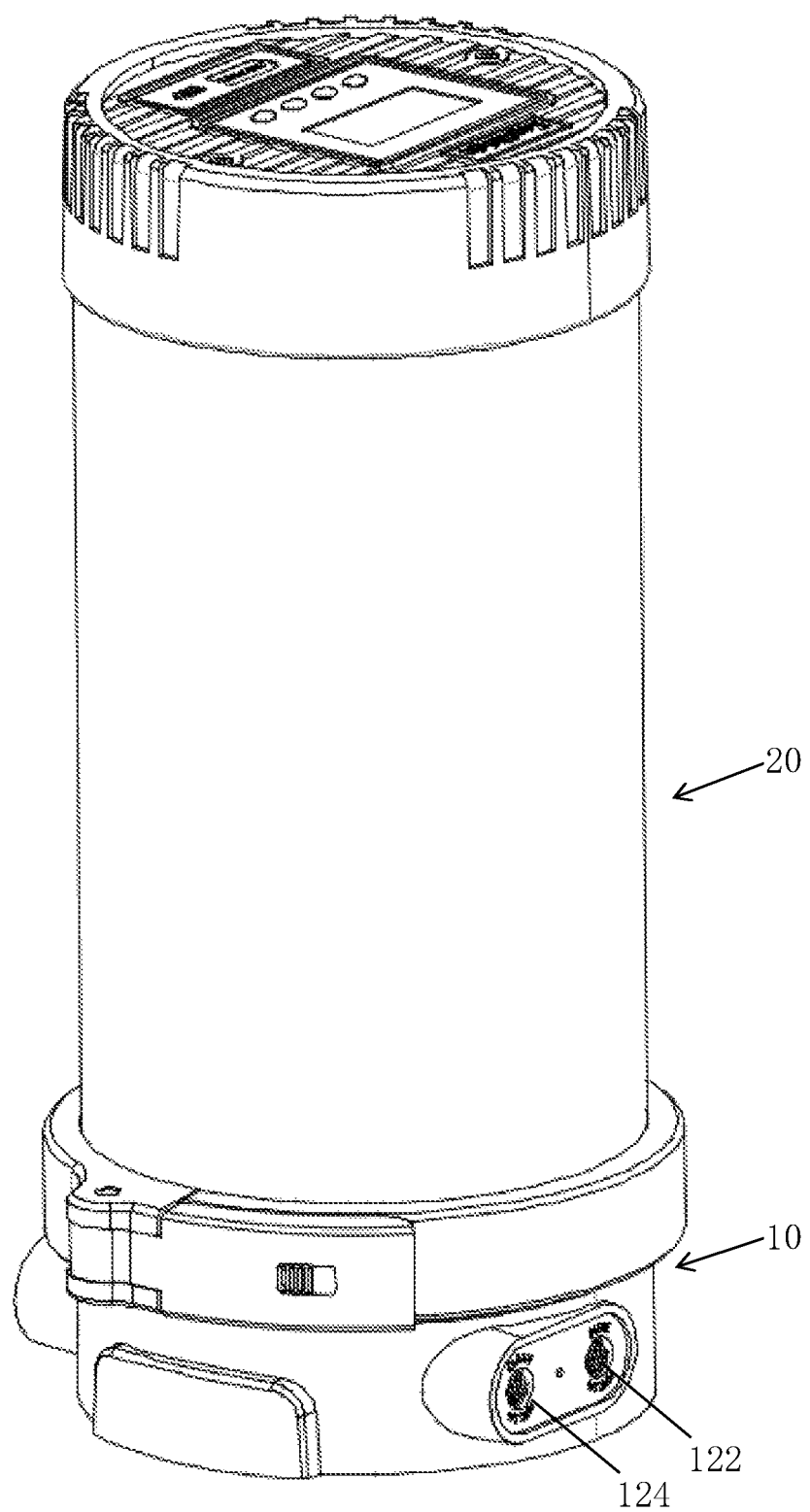
Figure 3:
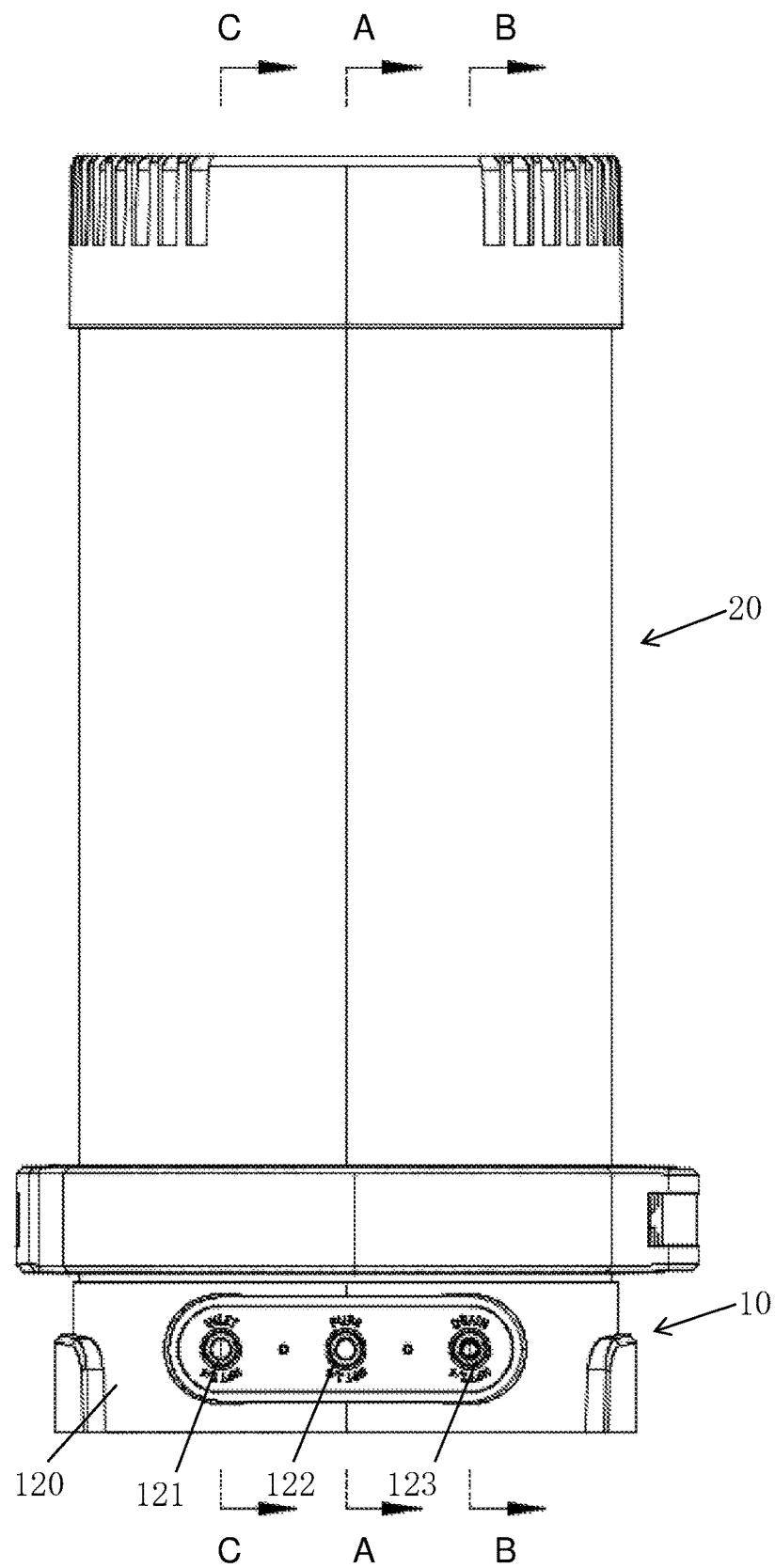
Figure 4:
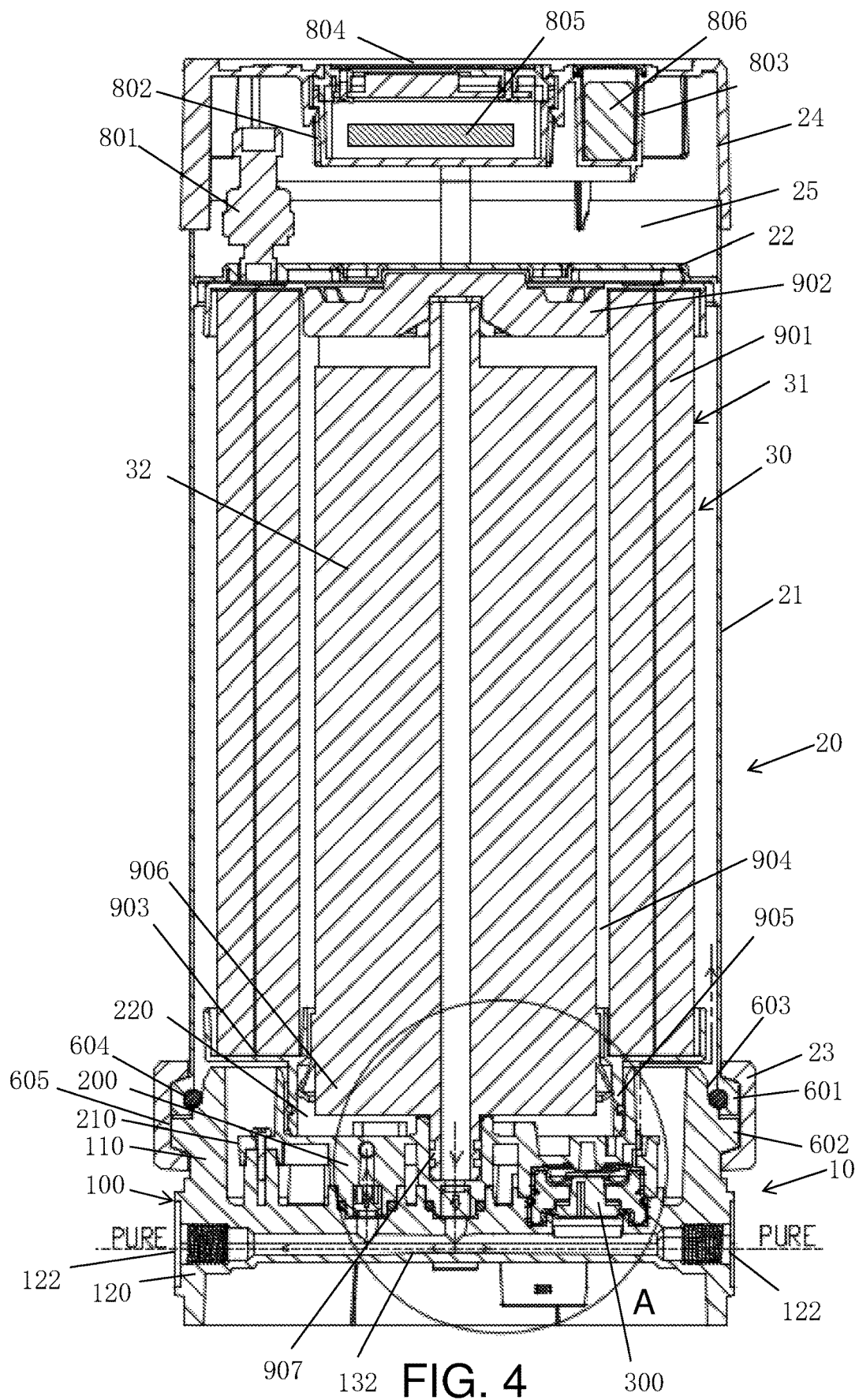
Figure 5:
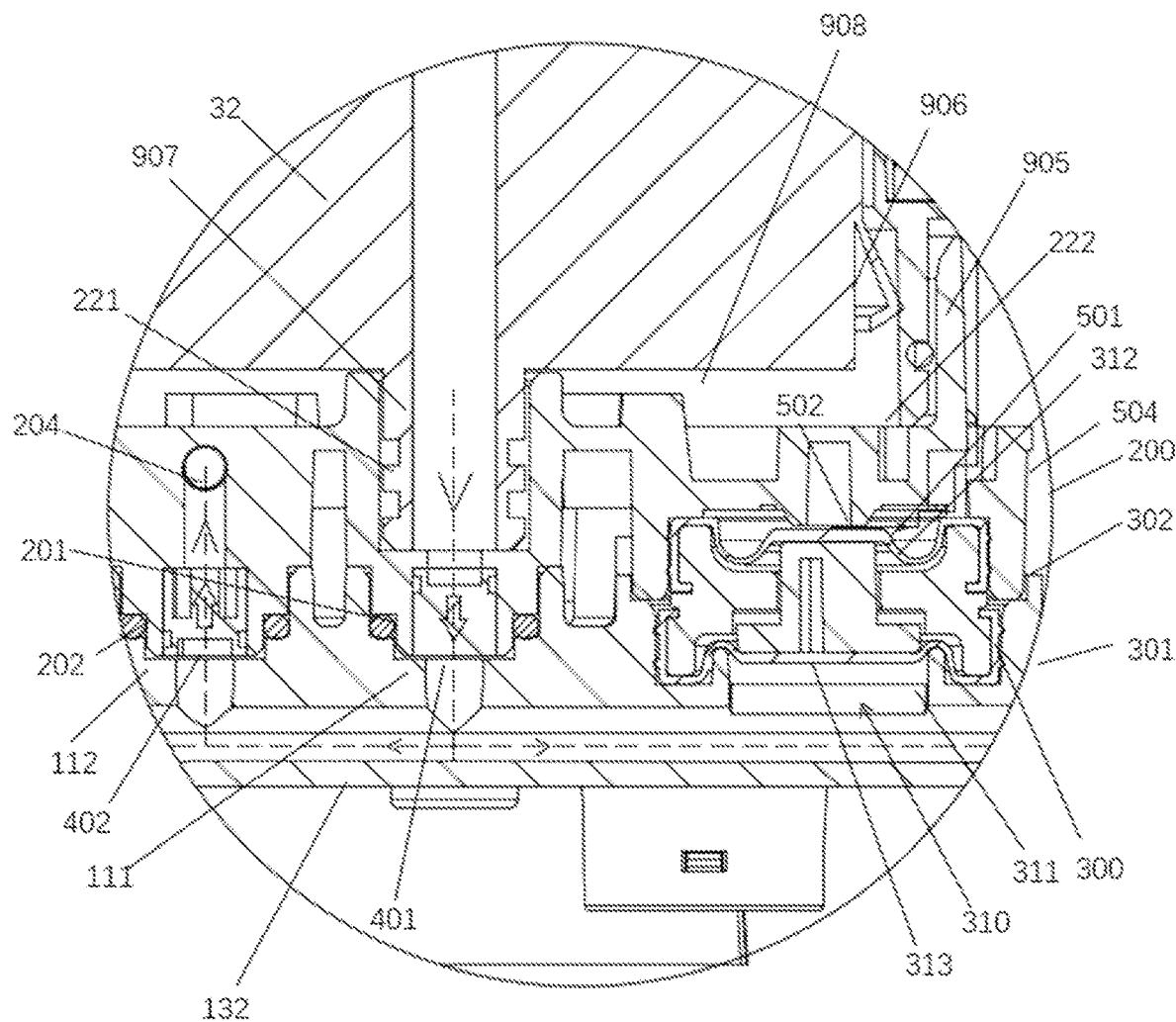
Figure 6:
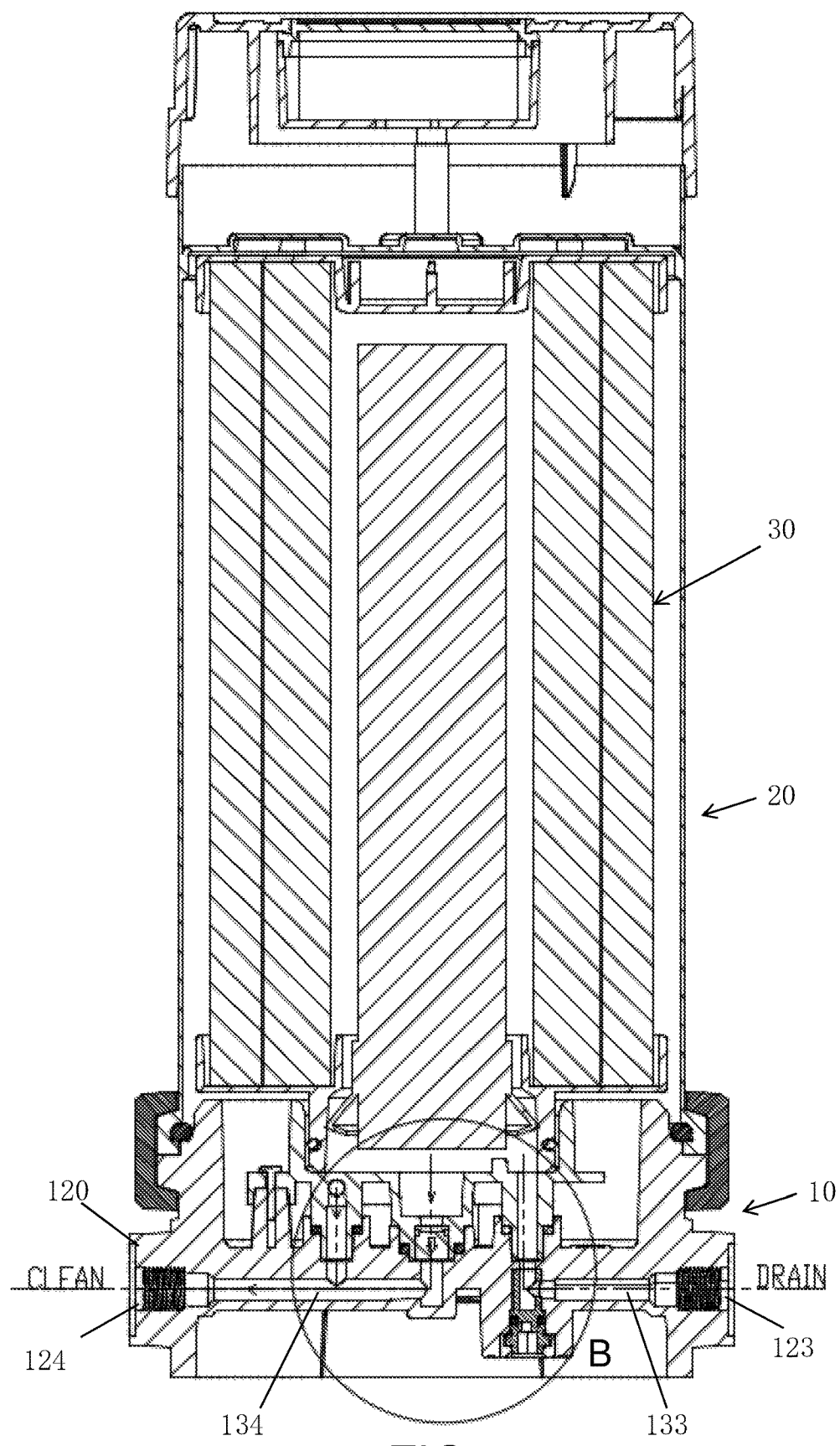
Figure 7:
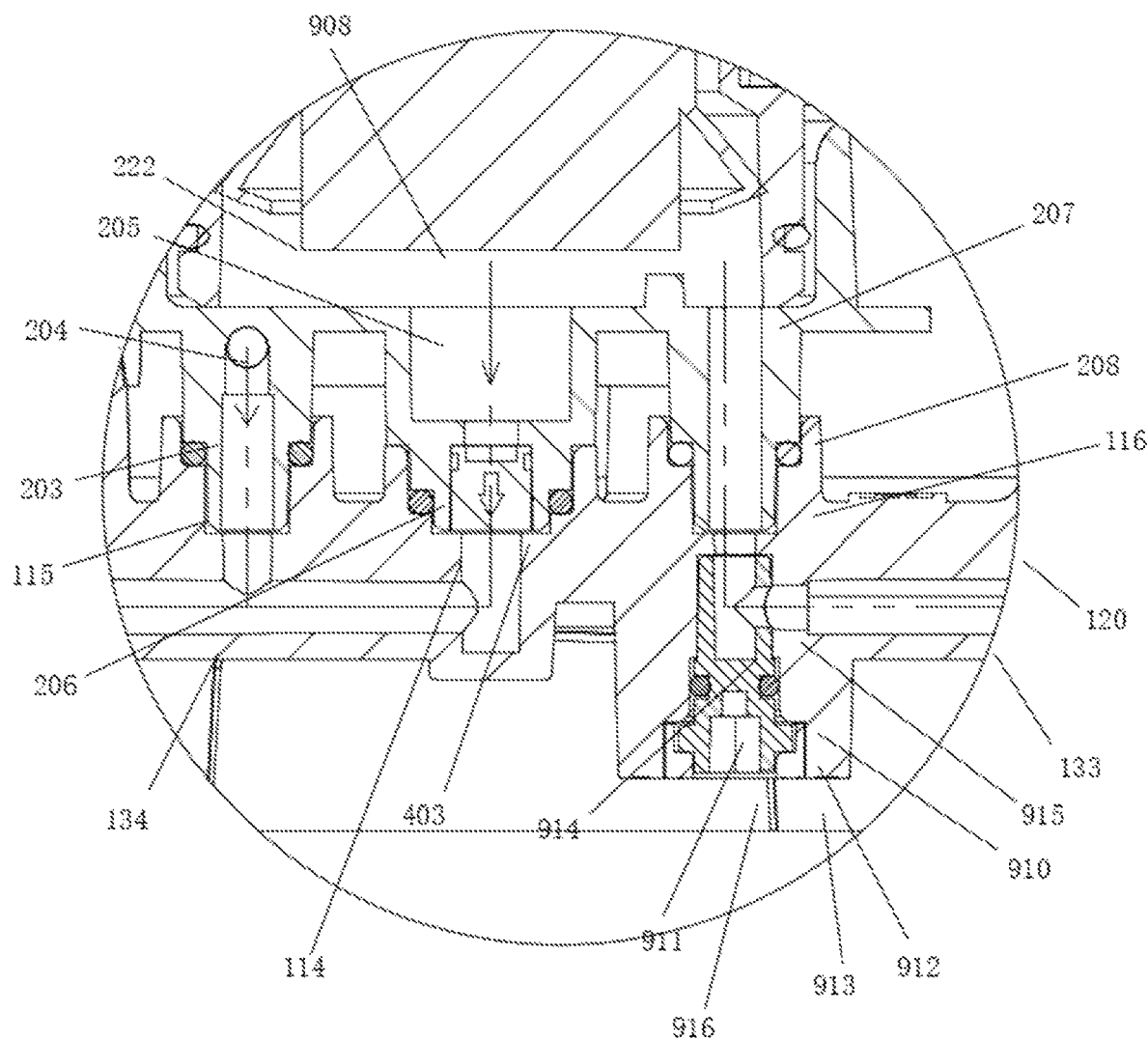
Figure 8:
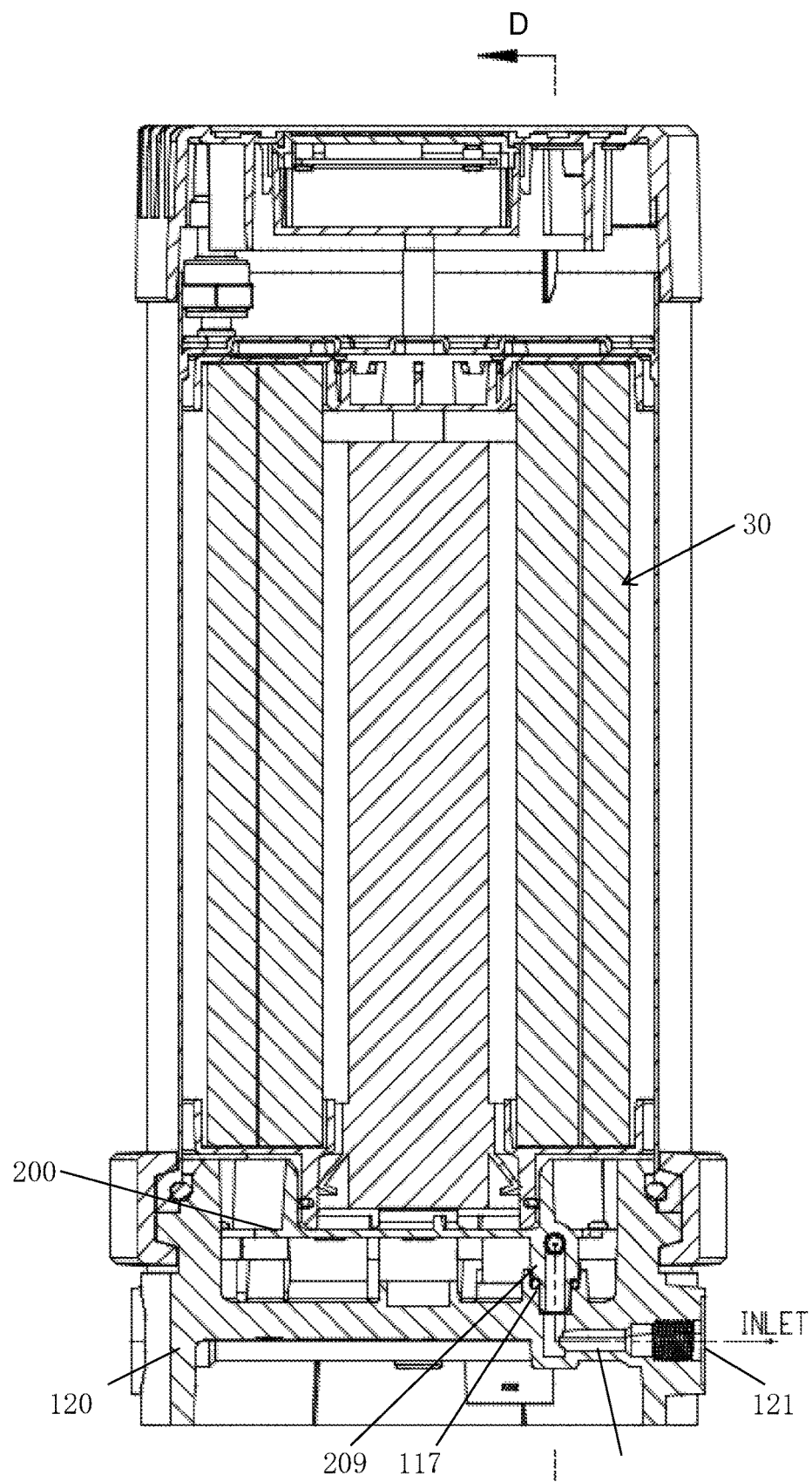
Figure 9:
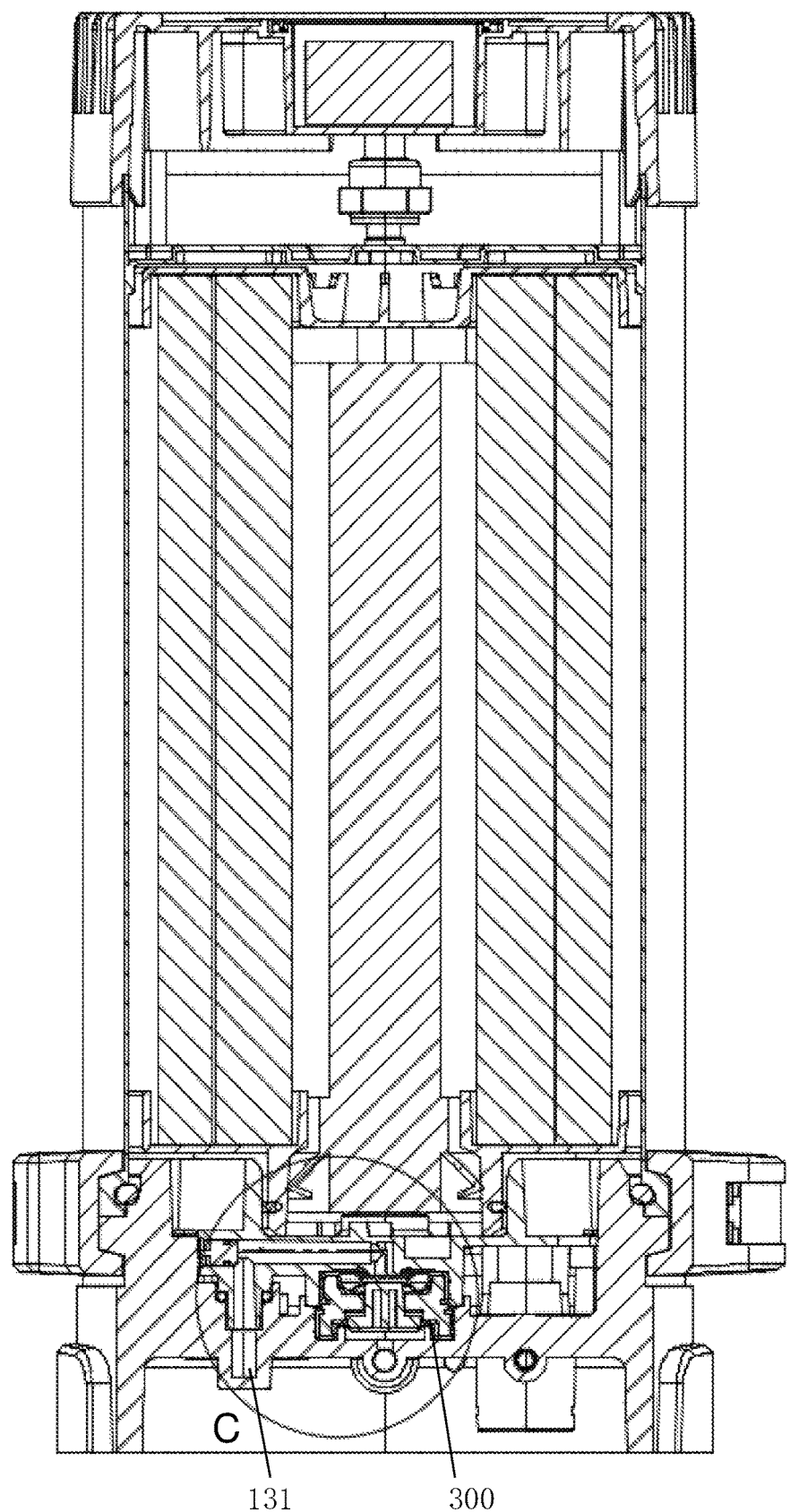
Figure 10:
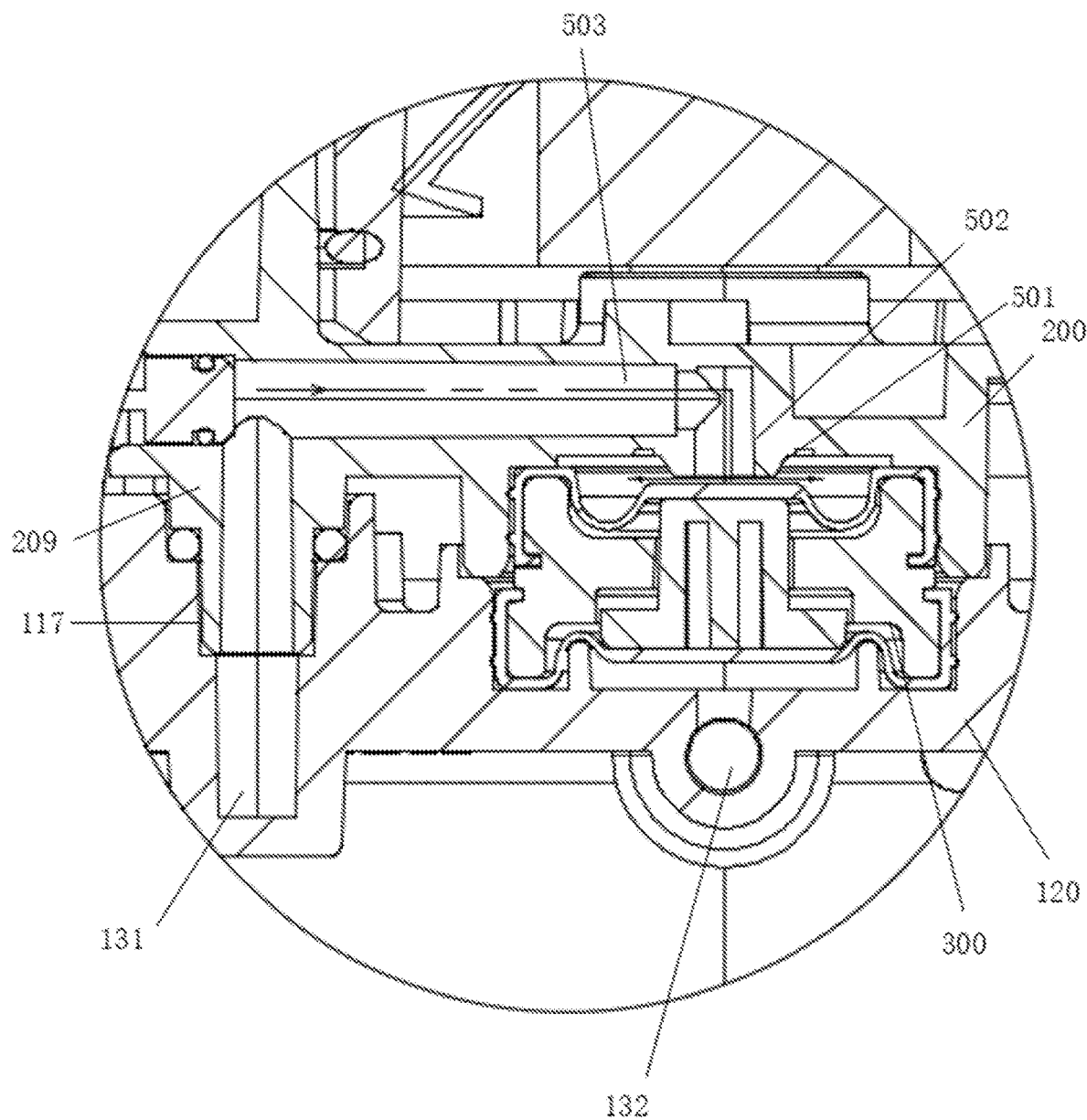
Figure 11:
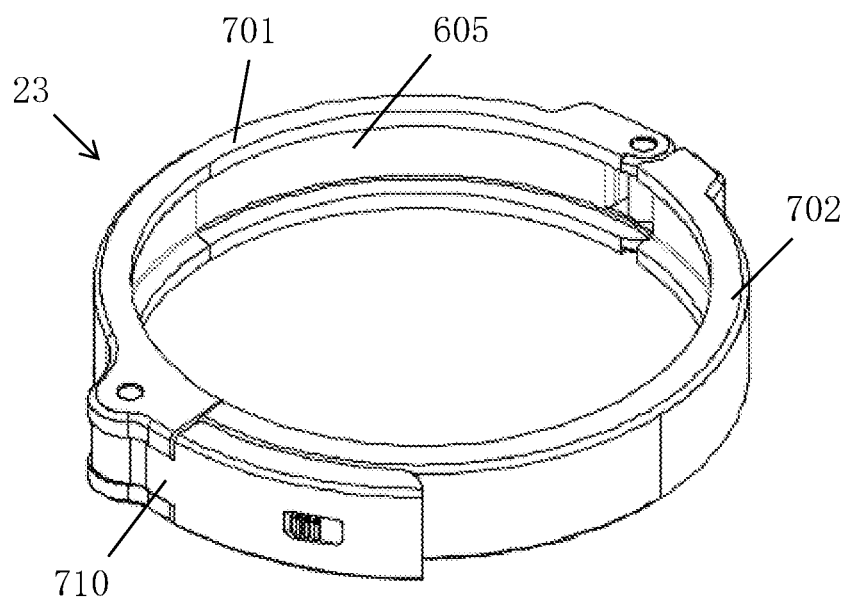
Figures 12, 13:
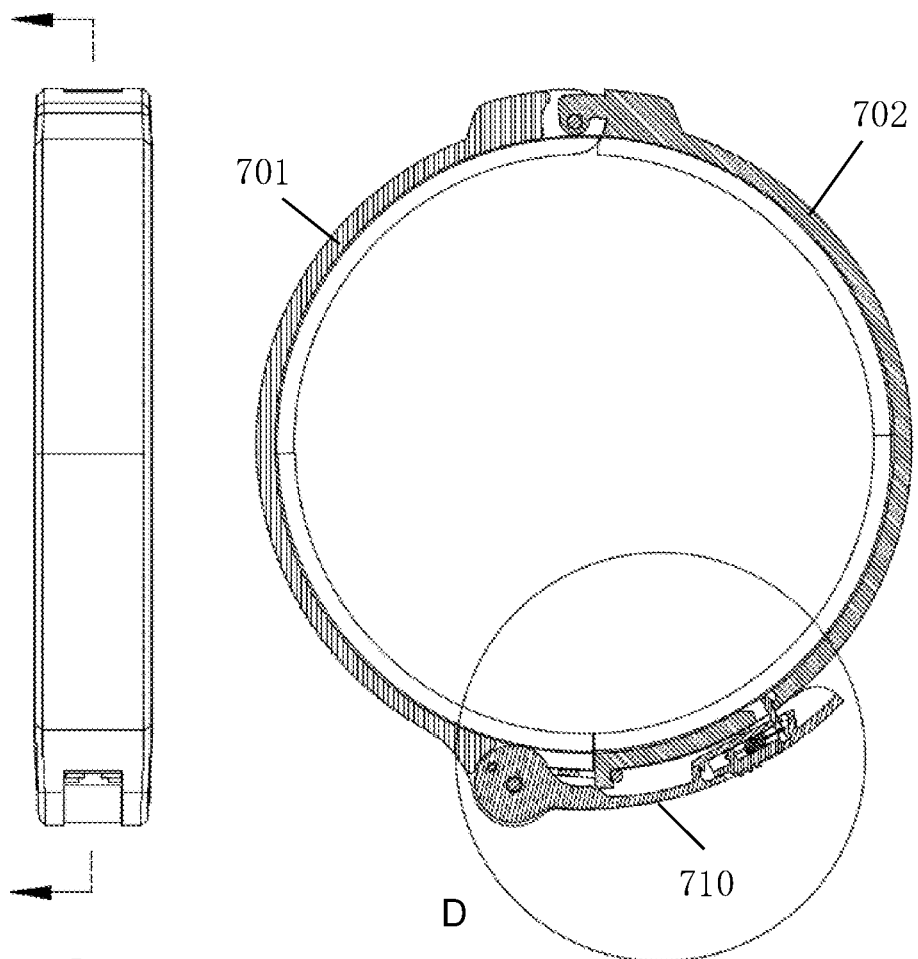
Figure 14:
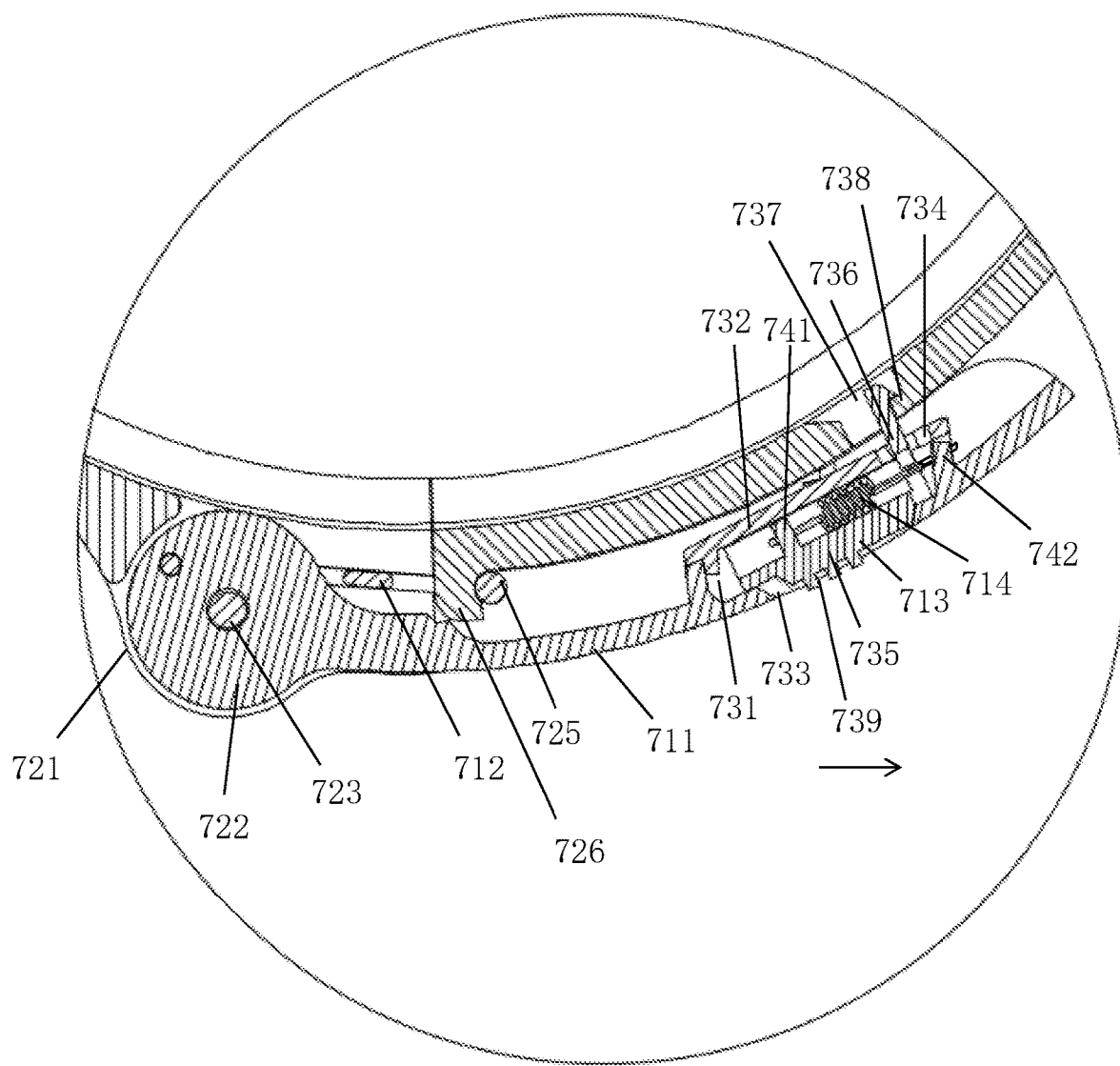
Figure 15:
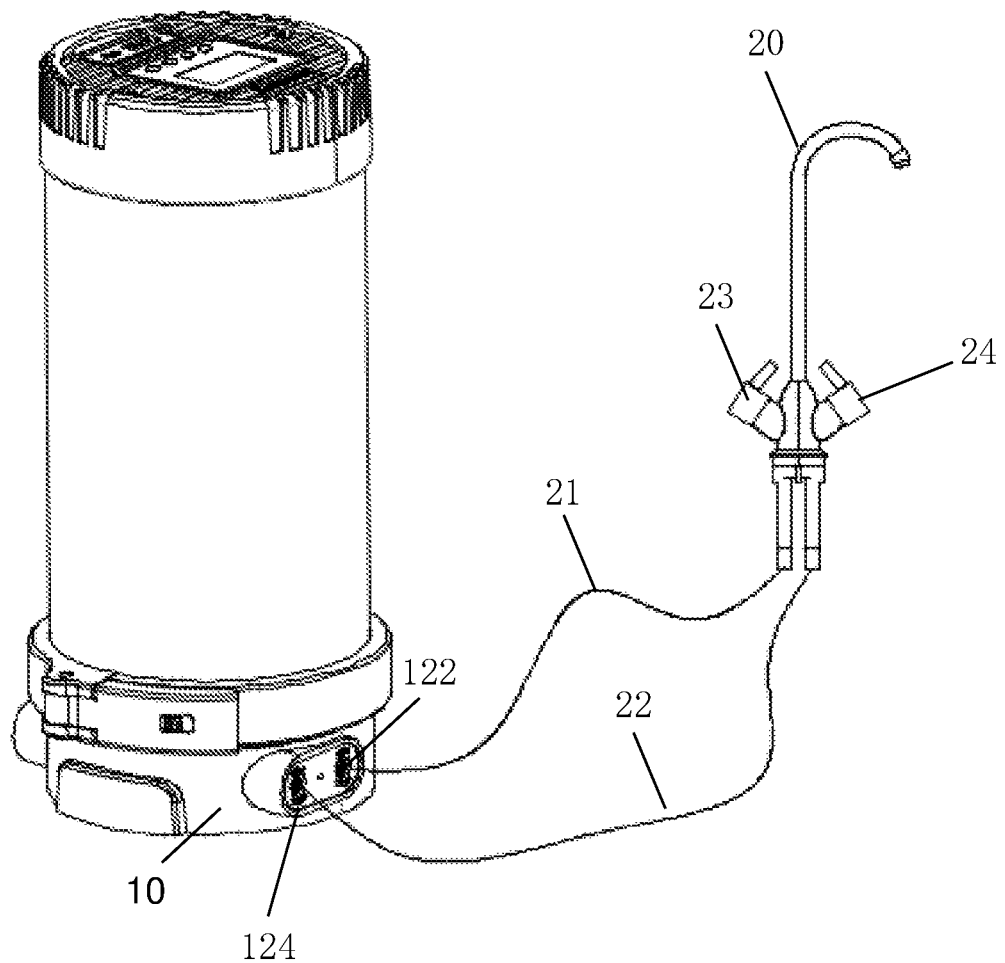

FIG. 1 is a perspective view of displaying a front side according to the present invention.
FIG. 2 is a perspective view of displaying a back side according to the present invention.
FIG. 3 is a front view of the present invention.
FIG. 4 is a sectional view taken along A-A in FIG. 3.
FIG. 5 is an enlarged view of a position A in FIG. 4.
FIG. 6 is a sectional view taking along B-B in FIG. 3.
FIG. 7 is an enlarged view of a position B in FIG. 6.
FIG. 8 is a sectional view taken along C-C in FIG. 3.
FIG. 9 is a sectional view taken along D-D in FIG. 8.
FIG. 10 is an enlarged view of a position C in FIG. 9.
FIG. 11 is a perspective view of a clamp.
FIG. 12 is a side view of a clamp.
FIG. 13 is a sectional view taken along E-E in FIG. 12.
FIG. 14 is an enlarged view of a position D in FIG. 13.
FIG. 15 is a schematic diagram of connection of a water purifier and a double-water-output faucet according to the present invention.

DETAILED DESCRIPTIONS OF EMBODIMENTS

As shown in FIGS. 1-4, a double-water-output cylindrical integrated water purifier of the present invention includes a base 10, a housing assembly 20 and a filter element assembly 30. The housing assembly 20 is of a cylindrical structure with a bottom mounted on the base 10, and the filter element assembly 30 is mounted inside the housing assembly 20.

The base 10 is made of a plastic material. The base 10 has a flow control function, and includes a base body 100, a water channel cover plate 200 and a control valve 300. The base body 100 is formed by a cavity portion 110 located above and a flow channel portion 120 located below.

Referring to FIGS. 5-9, a raw water inlet flow channel 131, a pure water outlet flow channel 132, a waste water outlet flow channel 133 and a clean water outlet flow channel 134, which all extend transversely, are also disposed inside the flow channel portion 120. In this embodiment, the raw water inlet flow channel 131, the pure water outlet flow channel 132 and the waste water outlet flow channel 133 are parallel to one another, and the clean water outlet flow channel 134 and the waste water outlet flow channel 133 are on a same straight line. The pure water outlet flow channel 132 is located at a middle position of the base, the raw water inlet flow channel 131 is located at one side of the pure water outlet flow channel 132, and the waste water outlet flow channel 133 and the clean water outlet flow channel 134 are located at the other side of the pure water outlet flow channel 132.

One end of the raw water inlet flow channel 131 communicates with the outside to form a raw water inlet 121, and the other end of the raw water inlet flow channel 131 terminates inside the flow channel portion 120. The pure water outlet flow channel 132 transversely penetrates through the entire base, with both ends communicating with the outside to form pure water outlets 122. One end of the waste water outlet flow channel 133 communicates with the outside to form a waste water outlet 123, and the other end of the waste water outlet flow channel 133 terminates inside the flow channel portion 120. One end of the clean water outlet flow channel 134 communicates with the outside to form a clean water outlet 124, the other end of the clean water outlet flow channel 134 terminates inside the flow channel portion 120. A position of the clean water outlet 124 on the base body 100 is opposed to the waste water outlet 123.

The raw water inlet 121, the waste water outlet 123 and one pure water outlet 122 are located at a same side of the base body 100 (i.e., a front side shown in FIG. 1), the clean water outlet 124 and the other pure water outlet 122 are located at the other side of the base body 100 (i.e., a back side shown in FIG. 2), and the clean water outlet 124 is opposed to the waste water outlet 123 (as shown in FIG. 6). The raw water inlet 121, the pure water outlet 122, the waste water outlet 123 and the clean water outlet 124 all have threads on their inner surfaces to connect with external water pipes.

As shown in FIG. 5, a first check valve cavity 111 is disposed at a central position of the bottom of the cavity portion 110 and located above the pure water outlet flow channel 132, and the first check valve cavity 111 is in communication with the pure water outlet flow channel 132. A second check valve cavity 112 and a lower half-cavity 301 are disposed at both sides of the first check valve cavity 111 at the bottom of the cavity portion 110 and located above the pure water outlet flow channel 132. The second check valve cavity 112 and the lower half-cavity 301 are also in communication with the pure water outlet flow channel 132. In addition, as shown in FIG. 7, a third check valve cavity 114 and a first insertion cavity 115 are also disposed at the bottom of the cavity portion 110 and located above the clean water outlet flow channel 134. The third check valve cavity 114 is located above an end position of the clean water outlet flow channel 134, and the third check valve cavity 114 and the first insertion cavity 115 are both in communication with the clean water outlet flow channel 134. A second insertion cavity 116 is also disposed at the bottom of the cavity portion 110 and located above an end position of the waste water outlet flow channel 133, and the second insertion cavity 116 is in communication with the waste water outlet flow channel 133. As shown in FIG. 8 and FIG. 10, a raw water insertion cavity 117 is disposed at the bottom of the cavity portion 110 and located above an end position of the raw water inlet flow channel 131.

Referring to FIG. 4 and FIG. 5, the water channel cover plate 200 is fixed in the cavity portion by screws, and includes a plate body 210 and a water collection cavity 220 located on the plate body 210. An upwardly-protruding partitioning ring is provided at a central position of the bottom of the water collection cavity 220 to partition the water collection cavity 220 into a pure water through-cavity 221 located at the central position and a waste water cavity 222 surrounding the partitioning ring. A pure water outlet central pipe 201 extending downwardly is provided at a lower end of the pure water through-cavity 221. The pure water outlet central pipe 201 is inserted into the first check valve cavity 111, and a sealing ring is provided between the pure water outlet central pipe 201 and the first check valve cavity 111. A first check valve 401 is disposed in the pure water outlet central pipe 201 to enable water to flow from the pure water through-cavity 221 to the pure water outlet flow channel 132 rather than from the pure water outlet flow channel 132 to the pure water through-cavity 221.

A pure water flow channel is formed from the pure water outlet 122, the pure water outlet flow channel 132, the first check valve cavity 111 and the pure water outlet central pipe 201, sequentially.

Referring to FIGS. 5-7, a pure water inlet pipe 202 and a pure water outlet pipe 203, which both protrude downwardly, are provided at the bottom of the water channel cover plate 200, and a pure water internal passage 204 communicating the pure water inlet pipe 202 with the pure water outlet pipe 203 is also provided inside the water channel cover plate 200. The pure water inlet pipe 202 is inserted into the second check valve cavity 112, and a sealing ring is provided between the pure water inlet pipe 202 and the second check valve cavity 112. A second check valve 402 is disposed in the pure water inlet pipe 202 to enable water to flow from the pure water outlet flow channel 132 to the pure water internal passage 204 inside the water channel cover plate 200 rather than from the pure water internal passage 204 to the pure water outlet flow channel 132. The pure water outlet pipe 203 is inserted into the first insertion cavity 115, and a sealing ring is provided between the pure water outlet pipe 203 and the first insertion cavity 115. A pure water branch flow channel is formed from the second check valve cavity 112, the pure water inlet pipe 202, the pure water internal passage 204, the pure water outlet pipe 203 and the first insertion cavity 115, sequentially.

As shown in FIG. 7, two waste water outlets are disposed at the bottom of the waste water cavity 222. A first waste water outlet pipe 206 extends from below a first waste water outlet 205. The first waste water outlet pipe 206 is inserted into the third check valve cavity 114, and a sealing ring is provided between first waste water outlet pipe 206 and the third check valve cavity 114. A third check valve 403 is disposed in the first waste water outlet pipe 206 to enable the water to flow from the waste water cavity 222 to the clean water outlet flow channel 134 rather than from the clean water outlet flow channel 134 to the waste water cavity 222. A waste water bypass flow channel is formed from the first waste water outlet 205, the first waste water outlet pipe 206 and the third check valve cavity 114, sequentially.

A second waste water outlet pipe 208 extends from below a second waste water outlet 207. The second waste water outlet pipe 208 is inserted into the second insertion cavity 116, and a sealing ring is provided between the second waste water outlet pipe 208 and the second insertion cavity 116. A waste water flow channel is formed from the second waste water outlet 207, the second waste water outlet pipe 208, the second insertion cavity 116, the waste water outlet flow channel 133 and the waste water outlet 123, sequentially.

A clean water flow channel is formed from the clean water outlet flow channel 134 and the clean water outlet 124 that are communicated with each other.

As shown in FIG. 8 and FIG. 10, a downwardly-protruding raw water inlet pipe 209 is also provided at the bottom of the water channel cover plate 200. The raw water inlet pipe 209 is inserted into the raw water inlet insertion cavity 117, and a sealing ring is provided between the raw water inlet pipe 209 and the raw water inlet insertion cavity 117.

Referring to FIG. 5, a downwardly-protruding upper half-cavity 302 is also provided at the bottom of the water channel cover plate 200. A control valve cavity 310 is formed by attaching the upper half-cavity 302 with the lower half-cavity 301 at the bottom of the cavity portion 110, and a control valve 300 is disposed in the control valve cavity 310. The control valve 300 is placed in the control valve cavity 310 with an active valve diaphragm 311 located in the lower half-cavity 301 and a passive valve diaphragm 312 located in the upper half-cavity 302. The control valve 300 is sealed with inner walls of the lower half-cavity 301 and the upper half-cavity 302 respectively by use of annular protruding ridges around the active valve diaphragm 311 and the passive valve diaphragm 312.

As shown in FIG. 10, a downwardly-protruding boss 501 is provided at the top of the upper half-cavity 302, and a water inlet 502 is provided in the center of the boss 501 and communicates with the raw water inlet pipe 209 via a raw water internal passage 503 inside the water channel cover plate 200. Referring to FIG. 5 again, a water outlet 504 is provided at the top of the upper half-cavity 302 and located outside the boss 501, and is in communication with an upper surface of the cover body 210 of the water channel cover plate 200 outside the water collection cavity 220. A water flow channel control section is formed by sequentially communicating the water inlet 502, a gap between the passive valve diaphragm and a boss end face, and the water outlet 504. A piston 313 is provided between the active valve diaphragm 311 and the passive valve diaphragm 312, and located exactly below the boss 501. When the piston 313 moves upward, the passive valve diaphragm 312 is pressed and moves upward to block the water inlet 502 so that the water flow channel control section is blocked, thus preventing raw water from entering the upper half-cavity 302 and flowing into the cylinder via the water outlet 504. Therefore, the purpose of cutting off water is realized. On the contrary, when the piston 313 does not press the passive valve diaphragm 312, the water inlet 502 and the water outlet 504 communicate with the upper half-cavity through the gap between the passive valve diaphragm and the boss end face, so that the water flow channel control section is unblocked and raw water can enter the cylinder through the water flow channel control section via the water inlet 502.

A raw water flow channel is formed from the raw water inlet 121, the raw water inlet flow channel 131, the raw water inlet insertion cavity 117, the raw water inlet pipe 209, the raw water internal passage 502 and the water flow channel control section, sequentially.

Referring to FIG. 4, the housing assembly 20 includes a cylinder body 21, a cylinder cover 22 and a clamp 23. The cylinder body 21 and the cylinder cover 22 are both made of a stainless material, and the cylinder cover 22 and an upper port of the cylinder body 21 are welded into an integral filter cylinder. A lower port of the cylinder body 21 is sleeved on an outer circumferential surface of the cavity portion 110 of the base body 100 and tightly clamped by the clamp 23. A sealing ring is disposed between the lower port of the cylinder body 21 and the outer circumferential surface of the cavity portion 110.

A first annular protruding ridge 601 is welded at an outer surface of the bottom end of the cylinder body 21, a second annular protruding ridge 602 is disposed at an outer surface of the cavity portion, a locating step 603 is also disposed at the outer surface of the cavity portion above the second annular protruding ridge 602, a sealing ring groove 604 is disposed at a position that is on an inner wall of the first annular protruding ridge 601 and corresponds to the locating step 603, and a sealing ring is placed in the sealing ring groove 604 to achieve sealing between the cylinder body 21 and the base 10. An annular clamp groove 605 is also disposed at an inner surface of the clamp 23. After the cylinder cover 22 and the cylinder body 21 are clamped by the clamp 23, the first annular protruding ridge 601 and the second annular protruding ridge 602 are both clamped in the annular clamp groove 605.

As shown in FIGS. 11-13, the clamp 23 is formed by hinging a first half-clamp 701 with a second half-clamp 702, and a locking mechanism 710 is provided between a free end of the first half-clamp 701 and a free end of the second half-clamp 702.

As shown in FIG. 14, the locking mechanism 710 includes a lever 711 and a lock catch 712 that are hinged at the free end of the first half-clamp 701. The entire lever 711 is an arc structure and can be attached to an outer surface of the second half-clamp 702 after being locked. A rotary shaft seat 721 protruding outwardly is provided at both sides of the free end of the first half-clamp 701. A circular disk 722 is provided at an end of the lever 711 and located between two rotary shaft seats 721, and a rotary pin 723 is penetrated through the center of the circular disk 722. Both ends of the rotary pin 723 are inserted into pin holes of the rotary shaft seats 721 to hinge the lever 711 with the first half-clamp 701. One end of the lock catch 712 is hinged at a position that is on the circular disk 722 and offsets from the rotary pin 723, and the other end of the lock catch 712 has a hook portion 725. An outwardly-protruding protrusion 726 is disposed at the free end of the second half-clamp 702. Since a hinging end of the lock catch 712 is eccentric relative to the rotary pin 723, when the lever 711 is pushed toward the second half-clamp 702, the lock catch 712 will move inwardly and backward (e.g., a direction indicated by the arrow in FIG. 7 is a forward direction) so as to finally hang the hook portion 725 on the protrusion 726 and closely tighten the clamp 23. When the lever 711 is pushed outwardly, the lock catch 712 will move outwardly and forward to separate the hook portion 725 from the protrusion 726, so as to loosen the clamp 23.

To avoid loosening the clamp 23 due to misoperation, the locking mechanism 710 further includes a safety structure, and the safety structure includes a sliding block groove cavity 731 located at an inner surface of the lever 711, a lock hook 713 and a tension spring 714 which are disposed in the sliding block groove cavity 731, and a cover plate 732 covered on the sliding block groove cavity 731. A window 733 is disposed at a position at an outer surface of the lever 711 and corresponds to the sliding block groove cavity 731, and a hole 734 is disposed at a front-end position of the cover plate 732 and corresponds to the sliding block groove cavity 731. The lock hook 713 includes a sliding block 735 disposed in the sliding block groove cavity 731 and a hook portion 736 that is integrally and vertically connected at a front end of the sliding block 735 and protrudes out of the hole 734, where the hook portion 736 can move back and forth in the hole 734. A lock hole 737 is disposed at a position of the second half-clamp 702 corresponding to the hook portion 736, and a stepped stop portion 738 hooked by a hook head of the hook portion 736 is disposed at a front-end position of the lock hole 737. A shifting block 739 formed from a plurality of ridges and protruded out of the window 733 is also disposed at an upper surface of the sliding block 735, and can move back and forth in the window 733. A first fixing column 741 extending inwardly to be in contact with the cover plate 732 is disposed at the rear portion of an inner surface of the sliding block 735 to support the lock hook 713. A second fixing column 742 is disposed at the inner surface of the lever 711 and located in front of the window 733, and a through-hole is disposed on the hook portion 736. The tension spring 714 is transversely placed in the sliding block groove cavity 731 and parallel to the sliding block 735, with a rear end connected on the first fixing column 741 and a front end connected to the second fixing column 742 through the through-hole on the hook portion 736. With the above structure, after the lever 711 is closed, the stop portion 738 of the lock hole 737 on the second half-clamp 702 is firmly hooked by the hook head of the hook portion 736 of the lock catch 712 under the pull force of the tension spring 714, thus preventing self-loosening. When the lever is to be opened, the shifting block 739 of the lock hook 713 is firstly shifted, and the sliding block 735 moves backward in the sliding block groove cavity 731 to separate the hook head of the hook portion 736 from the stop portion 738 of the lock hole 737. Such structure avoids inadvertently opening the lever due to misoperation and ensures that the cylinder body 21 can be tightly clamped onto the base 100 by the clamp 23.

Referring to FIG. 1 and FIG. 3, the housing structure further includes a housing cover 24 covered on the cylinder cover 22, where the housing cover 24 is a plastic piece which is connected to the cylinder cover 22 by bolts. A space 25 is formed between the housing cover 24 and the cylinder cover 22, a pressure sensor 801 is disposed in the space 25 and vertically inserted into the top of the cylinder cover 22, and a sensing head of the pressure sensor is protruded into the cylinder cover 22 to detect a water pressure in the cylinder. An electrical box 802 and a battery box 803 which are concaved into the space 25 are disposed at the top of the housing cover 24. The electrical box 802 is covered by a display operation panel 804, and a control circuit board 805 is placed in the electrical box 802. A battery 806 is placed in the battery box 803. A display screen 814 and operation buttons 815 are disposed on the display operation panel 804, and the battery 806 in the battery box 803 is connected to the control circuit board 805 of the electrical box 802 by a wire to supply power to the control circuit board 805. The pressure sensor 801, the display screen 814 and the operation buttons 815 are also electrically connected to the control circuit board 805, where the pressure sensor 801 transmits a water pressure signal to the control circuit board 805 for processing and displays the signal on the display screen 814, and the buttons 815 can be used to perform setting operations for a service life of a filter element based on regional water quality.

As shown in FIG. 4 and FIG. 5, the filter element assembly 30 includes a primary filter device 31 and a reverse osmosis filter element 32. A water-isolating convex ring 905 of the primary filter device 31 is inserted into the water collection cavity 220, and a sealing ring is provided between the water-isolating convex ring 905 and the water collection cavity 220.

The primary filter device 31 includes a primary filter element 901, an upper end plate 902 and a lower end plate 903. The primary filter element 901 is of a cylindrical structure with a central cavity 904 in the middle. The upper end plate 902 blocks an upper end face of the primary filter element 901 and an upper port of the central cavity 904. The lower end plate 903 blocks a lower end face of the primary filter element 901 and has a downwardly-protruding water-isolating convex ring 905 in communication with the central cavity 902.

The reverse osmosis filter element 32 is located in the central cavity 904 of the primary filter device 31, a sealing ring is wound around a circumferential surface of a water production end 906 of the reverse osmosis filter element 32 to form a seal with the water-isolating convex ring 905 of the primary filter device 31, a pure water production pipe 907 of the reverse osmosis filter element 32 is inserted into the pure water through-cavity 221 with a sealing ring provided therebetween, and a waste water outlet end face 908 of the reverse osmosis filter element 32 is located in the waste water cavity 222.

A filter element water inlet portion is formed by a gap between the circumferential surface of the primary filter element 901 and the cylinder body 21.

The primary filter element 901 and the reverse osmosis filter element 32 both belong to the prior art. The primary filter element 901 is composed of a PP cotton and a carbon rod. The PP cotton can filter out muddy sand, oxidized substances and suspended solids in water, and the carbon rod can remove chlorine and odor in water. The reverse osmosis filter element 32 can further filter out bacteria, viruses and heavy metals in water to finally provide pure water.

Referring to FIG. 7 again, a waste water adjusting valve is also added to adjust a waste water ratio. Specifically, an adjusting valve cavity 910 is disposed at the bottom of the flow channel portion 120 and located below the second insertion cavity 116. The adjusting valve cavity 910 is a stepped hole with an upper thin section and a lower thick section, and the upper section of the stepped hole is in communication with the waste water outlet flow channel 133. An adjusting valve core 911 is disposed in the adjusting valve cavity 910, a lower section of the adjusting valve core 911 has an annular flange 912, an annular cover plate 913 surrounding a lower end of the adjusting valve core 911 and covering the annular flange 912 is fixed at a lower mouth portion of the adjusting valve cavity 910 to stop the adjusting valve core 911 from separating from the adjusting valve cavity 710, and a sealing ring is provided between the adjusting valve cavity 910 and the adjusting valve core 911. A counterbore flow channel 914 with a closed bottom part and a top part communicating with the upper end face is disposed inside the upper section of the adjusting valve core 911, and a valve port 915 is disposed at a position that is at a side of the counterbore flow channel 914 and corresponds to the waste water outlet flow channel 133. A wrench counterbore 916 is disposed at a lower end face of the adjusting valve core 911. By inserting a wrench into the wrench counterbore 916, the adjusting valve core 911 can be rotated in the adjusting valve cavity 910 to enable the valve port 915 to be exactly opposed to or offset from the waste water outlet flow channel 133, so as to adjust a unit discharge amount of waste water and further adjust the waste water ratio:specifically, when the valve port 915 is exactly opposed to the waste water outlet flow channel 133, the unit discharge amount of waste water is the largest; the more the valve port 915 is offset from the waste water outlet flow channel 133, the smaller the amount of unit discharge waste water.

The above descriptions depict the double-water-output cylindrical integrated water purifier of the present invention. The working mode of the double-water-output cylindrical integrated water purifier is described below.

The raw water inlet 121 is connected to a tap water pipe. As shown in FIG. 15, two pure water outlets 122 of the pure water outlet flow channel 132 are connected to a water storage barrel and a pure water pipe 21 of the double-water-output faucet 20, respectively, the waste water outlet 123 is connected to a waste water pipe, and the clean water outlet 124 is connected to a clean water pipe 22 of the double-water-output faucet 20.

It is assumed that a pure water valve 23 and a clean water valve 24 of the double-water-output faucet 20 are both closed. Initially, raw water (that is, tap water or another unfiltered water) enters from the raw water inlet 121, and then flows through the raw water inlet flow channel 131, the raw water insertion cavity 117, the raw water inlet pipe 209, the raw water internal passage 503, the water inlet 502, the upper half-cavity and the water outlet 504 sequentially into the filter cylinder, enters a primary filter element sidewise from a gap between the cylinder body 21 and the primary filter element 901, enters the central cavity after primary filtration, and enters the reverse osmosis filter element 32 from the upper end face (i.e., the water inlet end face of the reverse osmosis filter element 32 for filtration). A part of the filtered water becomes pure water which enters the pure water production pipe 907 and flows through the pure water through-cavity 221, the first check valve cavity 111, the pure water outlet flow channel 132 and the pure water outlet 122 into the water storage barrel. Waste water is discharged into the waste water cavity 222, where one part of the waste water flows through the first waste water outlet 205, the first waste water outlet pipe 206, the third check valve 403 and the third check valve cavity 114 into the clean water outlet flow channel 134, and the other part of the waste water flows through the second waste water outlet 207, the second waste water outlet pipe 208, the second insertion cavity 116, the waste water outlet flow channel 133 and the waste water outlet 123 into a sewer. Since the pure water valve and the clean water valve of the double-water-output faucet are both closed, when the water storage barrel is filled up with the pure water, the water pressure in the pure water outlet flow channel 132 will be increased to press the active valve diaphragm 311 of the control valve 300 and drive the piston 313 to move upward, and the piston 313 further presses the passive valve diaphragm 312 onto the end face of the boss 501 to block the water inlet 502 and isolate the water inlet 502 from the water outlet 504, thus preventing the inflow of the raw water and achieving automatic water cutoff.

If the reverse osmosis filter element is a large-flow reverse osmosis filter element, for example a large-flow reverse osmosis filter element of 1000 gallons, the water storage barrel may be omitted as long as the water outlet 122 connected to the water storage barrel is blocked.

When the user chooses to use pure water, the pure water valve 23 (the clean water valve 24 is closed at this time) in the double-water-output faucet 20 is opened. As pure water flows out, the water pressure in the pure water outlet flow channel 132 decreases, a pressing force on the active valve diaphragm 311 diminishes, and the piston 313 moves downwardly to release the passive valve diaphragm 312 and open the water inlet 502 such that the water inlet 502 is re-communicated with the water outlet 504 via the upper half-cavity; thus, the raw water can smoothly enter the filter cylinder for filtration to continuously produce pure water. When the pure water valve in the double-water-output faucet is re-closed, as described above, the water pressure in the pure water outlet flow channel 132 will be increased, and the control valve 300 will cut off the inflow of the raw water and stop water production.

When the user chooses to use clean water, the clean water valve 24 (the pure water valve 23 is closed at this time) in the double-water-output faucet 20 is opened. Since the clean water outlet flow channel 134 is in communication with the pure water outlet flow channel 132, after the clean water valve 24 in the double-water-output faucet 20 is opened, the water pressure in the pure water outlet flow channel 132 will be also decreased. As described above, the control valve will also open the water inlet 502 to resume pure water production; at this time, a part of the produced waste water flows through the first waste water outlet 205, the first waste water outlet pipe 206, the third check valve 403 and the third check valve cavity 114 into the clean water outlet flow channel 134, is mixed with the pure water flowing into the clean water outlet flow channel 134, and flows out of the double-water-output faucet. In this way, a large flow of clean water is formed to satisfy the non-drinking requirements of people. Certainly, when the clean water valve 24 of the double-water-output faucet 20 is re-closed, as described above, the water pressure in the pure water outlet flow channel 132 will be increased, and the control valve 300 will cut off the inflow of the raw water and stop water production.

It can be seen from the above detailed descriptions that the present invention has the following advantages.

The cylindrical integrated water purifier can produce both pure water and large-flow clean water, thereby improving the functions of this type of water purifiers, satisfying various water use requirements of users, reducing waste water discharge, saving water resources, and bringing a broad application prospect.

The sealing structure of the water channel cover plate of the control valve is disposed inside the base body to eliminate exposure of the cover plate. Even if there is water leakage, the water will stay inside the water purifier rather than flow out of the water purifier. Further, the leaking water will be re-used after filtration of the filter element, thereby preventing the leaking water seeping out of the water purifier. Furthermore, the water channel cover plate is disposed inside the base body and not exposed outsides to avoid secondary pollution.

However, those of ordinary skill in the art shall recognize that the above embodiments are merely used to describe the present invention but not intended to limit the present invention; changes and modifications of the above embodiments made within the spirit of the present invention shall all fall into the scope of the claims of the present invention.

What is claimed is:

1. A double-water-output cylindrical integrated water purifier, comprising a base, a filter cylinder mounted on the base, and a filter element assembly located in the filter cylinder, wherein a raw water flow channel, a pure water flow channel and a waste water flow channel are disposed in the base, and a raw water inlet in communication with the raw water flow channel, a pure water outlet in communication with the pure water flow channel, and a waste water outlet in communication with the waste water flow channel are disposed at a side of the base respectively; a pure water production pipe of the filter element assembly is in communication with the pure water flow channel, and a first check valve for controlling water to flow into the pure water flow channel unidirectionally is disposed therebetween; a waste water outlet end face of the filter element assembly is in communication with the waste water flow channel; a control valve for controlling the raw water flow channel to be turned on and off based on a water pressure of the pure water flow channel is disposed in the base;

a clean water flow channel, a pure water branch flow channel and a waste water bypass flow channel are further disposed in the base, and a clean water outlet in communication with the clean water flow channel is disposed at a side of the base; the pure water flow channel communicates with the clean water flow channel via the pure water branch flow channel, and a second check valve for controlling water to flow into the clean water flow channel unidirectionally is disposed in the pure water branch flow channel; the waste water outlet end face is further communicated with the clean water flow channel via the waste water bypass flow channel, and a third check valve for controlling water to flow into the clean water flow channel unidirectionally is disposed in the waste water bypass flow channel, wherein the clean water flow channel is connected to the clean water pipe of a double-water-output faucet, and the pure water flow channel is connected to the pure water pipe of the double-water-output faucet;

wherein the base comprises a base body and a water channel cover plate fixed at the bottom of a cavity portion of the base, the water channel cover plate comprises a plate body and an upwardly-protruding water collection cavity integrally connected to the plate body, the water collection cavity is divided into a pure water through-cavity and a waste water cavity, the pure water through-cavity is in communication with the pure water flow channel, the pure water production pipe is inserted into the pure water through-cavity, and a first waste water outlet in communication with the waste water bypass flow channel and a second waste water outlet in communication with the waste water flow channel are disposed at the bottom of the waste water cavity respectively, a first waste water outlet pipe extends from the first waste water outlet, and a second waste water outlet pipe extends from the second waste water outlet;

wherein the pure water flow channel is formed from the pure water outlet, a pure water outlet flow channel, a first check valve cavity and a pure water outlet central pipe, sequentially, and the first check valve is disposed in the pure water outlet central pipe to enable water to flow from the pure water through-cavity to the pure water outlet flow channel unidirectionally;

wherein the pure water branch flow channel is formed from a second check valve cavity, a pure water inlet pipe, a pure water internal passage, a pure water outlet pipe and a first insertion cavity, sequentially, and the second check valve is disposed in the pure water inlet pipe to enable water to flow from the pure water outlet flow channel to the pure water internal passage unidirectionally;

wherein the clean water flow channel is formed from a clean water outlet flow channel and the clean water outlet that are communicated with each other;

wherein the waste water flow channel is formed from the second waste water outlet, the second waste water outlet pipe, a second insertion cavity, a waste water outlet flow channel and the waste water outlet, sequentially; and wherein the waste water bypass flow channel is formed from the first waste water outlet, the first waste water outlet pipe and a third check valve cavity, sequentially, and the third check valve is disposed in the first waste water outlet pipe to enable the water to flow from the waste water cavity to the clean water outlet flow channel unidirectionally.

2. The double-water-output cylindrical integrated water purifier according to claim 1, wherein a control valve cavity is formed between the water channel cover plate and the bottom of the cavity portion, the control valve is disposed in the control valve cavity, an active valve diaphragm of the control valve is located in a lower half-cavity of the control valve cavity, and the lower half-cavity is in communication with the pure water flow channel; a passive valve diaphragm of the control valve is located in an upper half-cavity of the control valve cavity, a water flow channel control section located in the upper half-cavity is disposed in the raw water flow channel, and the passive valve diaphragm is capable of cutting off the water flow channel control section under pressure of a piston of the control valve driven by the active valve diaphragm.

3. The double-water-output cylindrical integrated water purifier according to claim 2, wherein a boss is disposed at the top of the upper half-cavity, a water inlet is disposed in the center of the boss, a water outlet is disposed at the top of the upper half-cavity and located outside the boss, the passive valve diaphragm is located below the boss, the water outlet is in communication with a water inlet portion of the filter element assembly, and the water flow channel control section is formed by sequentially communicating the water inlet, a gap between the passive valve diaphragm and a boss end face, and the water outlet.

4. The double-water-output cylindrical integrated water purifier according to claim 1, wherein a lower end of the filter cylinder is clamped on the base by a clamp.

5. The double-water-output cylindrical integrated water purifier according to claim 4, wherein the filter cylinder is made of a stainless material and comprises a cylinder body and a cylinder cover, and the cylinder cover and an upper port of the cylinder body are welded integrally.

6. The double-water-output cylindrical integrated water purifier according to claim 5, wherein a first annular protruding ridge is welded at an outer surface of a bottom end of the cylinder body, a second annular protruding ridge is disposed at an outer surface of the base, an annular clamp groove is further disposed at an inner surface of the clamp, and the first annular protruding ridge and the second annular protruding ridge are both clamped in the annular clamp groove after the base and the cylinder body are clamped by the clamp.

7. The double-water-output cylindrical integrated water purifier according to claim 6, wherein the clamp is formed by hinging a first half-clamp with a second half-clamp, and a locking mechanism is disposed between a free end of the first half-clamp and a free end of the second half-clamp; the locking mechanism comprises a lever hinged at the free end of the first half-clamp and a lock catch hinged on the lever, a rotary shaft seat protruding outwardly is disposed at both sides of the free end of the first half-clamp respectively, a circular disk is disposed at an end of the lever and located between the two rotary shaft seats, a rotary pin is penetrated through the center of the circular disk, with both ends inserted into pin holes of the rotary shaft seats respectively, one end of the lock catch is hinged at a position that is on the circular disk and offset from the rotary pin, the other end of the lock catch has a hook portion, and a protrusion capable of protruding outwardly and being hooked by the hook portion is disposed at the free end of the second half-clamp.

8. The double-water-output cylindrical integrated water purifier according to claim 7, wherein the locking mechanism further comprises a safety structure, and the safety structure comprises a sliding block groove cavity located at an inner surface of the lever, a lock hook and a tension spring that are disposed in the sliding block groove cavity, and a cover plate covered on the sliding block groove cavity; a window is disposed at a position that is at an outer surface of the lever and corresponds to the sliding block groove cavity, and a hole is disposed at a front-end position that is on the cover plate and corresponds to the sliding block groove cavity; the lock hook comprises a sliding block disposed in the sliding block groove cavity and a hook portion that is integrally connected at a front end of the sliding block and protrudes out of the hole, a lock hole is disposed at a position of the second half-clamp corresponding to the hook portion, and a stop portion hooked by a hook head of the hook portion is disposed at a front-end position of the lock hole; a shifting block protruding out of the window is further disposed at an upper surface of the sliding block, a first fixing column is disposed at a rear portion of an inner surface of the sliding block, a second fixing column is disposed at the inner surface of the lever located in front of the window, and the tension spring is transversely placed in the sliding block groove cavity with a rear end connected on the first fixing column and a front end connected on the second fixing column through a through-hole on the hook portion.

9. The double-water-output cylindrical integrated water purifier according to claim 6, wherein a housing cover is disposed above the cylinder cover, a space is formed between the housing cover and the cylinder cover, a pressure sensor inserted into the cylinder cover is disposed in the space, and a sensing head of the pressure sensor is protruded into the cylinder cover.

* * * * *